United States Patent
Liu et al.

(10) Patent No.: US 12,490,671 B2
(45) Date of Patent: Dec. 9, 2025

(54) ROBOTIC LAWNMOWER

(71) Applicant: Shenzhen Hua Xin Information Technology Co., Ltd., Shenzhen (CN)

(72) Inventors: Hanjun Liu, Shenzhen (CN); Bin Chen, Shenzhen (CN)

(73) Assignee: Shenzhen Hua Xin Information Technology Co., Ltd., Shenzhen (CN)

( * ) Notice: Subject to any disclaimer, the term of this patent is extended or adjusted under 35 U.S.C. 154(b) by 226 days.

(21) Appl. No.: 18/417,035

(22) Filed: Jan. 19, 2024

(65) Prior Publication Data

US 2024/0180073 A1 Jun. 6, 2024

Related U.S. Application Data

(63) Continuation of application No. PCT/CN2023/081767, filed on Mar. 16, 2023.

(30) Foreign Application Priority Data

Nov. 30, 2022 (CN) .......................... 202211520917.5

(51) Int. Cl.
*A01D 34/416* (2006.01)
*A01D 34/00* (2006.01)
(Continued)

(52) U.S. Cl.
CPC ....... *A01D 34/4162* (2013.01); *A01D 34/008* (2013.01); *A01D 34/84* (2013.01); *A01D 69/02* (2013.01); *A01D 2101/00* (2013.01)

(58) Field of Classification Search
CPC ..... A01D 34/4162; A01D 34/84; A01D 69/02
See application file for complete search history.

(56) References Cited

U.S. PATENT DOCUMENTS

| 5,159,803 | A | 11/1992 | Earley |
| 2021/0112709 | A1 | 4/2021 | Kave et al. |
| 2021/0185909 | A1* | 6/2021 | Hoche .................. A01D 34/416 |

FOREIGN PATENT DOCUMENTS

| CN | 101048059 A | 10/2007 |
| EP | 2547193 B1 | 3/2017 |

(Continued)

OTHER PUBLICATIONS

English Translation of WO-2018077231-A1 (Year: 2018).*
English Translation of WO-2019192201-A1 (Year: 2019).*

*Primary Examiner* — Claude J Brown
(74) *Attorney, Agent, or Firm* — IPro, PLLC; Na Xu

(57) ABSTRACT

A robotic lawnmower comprising a robotic body and a trimmer mechanism. A mount column hole is arranged in a side face of the robotic body. The trimmer mechanism includes a mount, a trimmer head and a drive motor. The mount includes a stand and a connection portion. The connection portion is fixedly connected to the stand and configured to be inserted into the mount hole. The trimmer head is rotatably arranged on a bottom face of the stand. The drive motor is configured to drive the trimmer head to rotate. The robotic lawnmower with the trimmer mechanism is capable of covering and trimming the areas within a specific width distant from the edges of the lawns, which effectively solves the problem that the conventional robotic lawnmowers are incapable of covering and trimming such areas of the lawns, reduces manual workload, and lowers cost of manpower.

7 Claims, 7 Drawing Sheets

(51) Int. Cl.
*A01D 34/84* (2006.01)
*A01D 69/02* (2006.01)
*A01D 101/00* (2006.01)

(56) References Cited

FOREIGN PATENT DOCUMENTS

| | | | |
|---|---|---|---|
| WO | WO-2018077231 A1 * | 5/2018 | ........... A01D 34/416 |
| WO | WO-2019192201 A1 * | 10/2019 | ............. A01G 3/067 |

* cited by examiner

ROBOTIC LAWNMOWER

This application is based upon and claims priority to Chinese Patent Application No. 202211520917.5, filed before China National Intellectual Property Administration on Nov. 30, 2022 and entitled "ROBOTIC LAWNMOWER," the entire contents of which are incorporated herein by reference.

TECHNICAL FIELD

Embodiments of the present disclosure relate to the technical field of lawnmower machines, and in particular, relate to a robotic lawnmower.

BACKGROUND

A robotic lawnmower is a smart yard care device designed to automatically mow lawns according to set programs and predefined paths, such that the lawns are maintained at a desired grass height, which greatly enhances users' living experience.

However, a drawback lies in the current design of conventional robotic lawnmowers, which lack a structural design for cutting the weeds along the edges of the lawns. Within a specific width distant from the edges of the lawns, there exists areas that the mowers cannot cover, leaving the weeds untrimmed. As a result, users have to manually trim the weeds in the uncovered areas, which increases their workload and causes inconvenience.

SUMMARY

Embodiments of the present application are mainly intended to provide a robotic lawnmower, which addresses the above technical problem or at least partially addresses the above technical problem.

Embodiments of the present disclosure provides a robotic lawnmower. The robotic lawnmower includes a robotic body and a trimmer mechanism. A mount hole is arranged in a side face of the robotic body. The trimmer mechanism includes a mount, a trimmer head, a drive motor, and a control assembly. The mount includes a stand and a connection portion. The connection portion is fixedly connected to the stand and configured to be inserted into the mount hole. The trimmer head is rotatably arranged on a bottom face of the stand. The drive motor is arranged on the stand. The drive motor is connected to the trimmer head and configured to drive the trimmer head to rotate. The control assembly is communicably connected to the drive motor.

Optionally, the trimmer head includes a housing, a spool, an elastic member, and a trimmer line; wherein the housing is arranged at a bottom portion of the stand, an accommodation chamber and a through hole are arranged in the housing, and a ratchet bump is arranged at a bottom portion of the housing, wherein the through hole is in communication with the accommodation chamber, a ratchet groove is arranged in the spool, the spool is arranged in the accommodation chamber, the elastic member is situated between the spool and a top portion of the housing, the elastic member is configured to drive the spool to be abutted against the bottom portion of the housing such that the ratchet bump is inserted into the ratchet groove and is meshed with the ratchet groove in a rotation direction of the drive motor for synchronous rotation of the spool and the housing, one end of the trimmer line extends out from the through hole, the drive motor is arranged on the stand, an output shaft of the drive motor extends into the housing and is connected to the spool, the drive motor is configured to drive the spool to rotate and drive the housing to synchronously rotate to drive the trimmer line to rotate and unreel the trimmer line, and the drive motor is communicably connected to the control assembly.

Optionally, the trimmer mechanism further includes a detection assembly, wherein the detection assembly is arranged on the stand, the detection assembly is communicably connected to the control assembly, the detection assembly is configured to detect whether an unreeling length of the trimmer line reaches a predetermined length, and the control assembly is configured to, in response to detecting that the unreeling length of the trimmer line does not reach the predetermined length, control the drive motor to rotate such that the spool unreels the trimmer line until the unreeling length of the trimmer line reaches the predetermined length.

Optionally, the detection assembly includes a first swing arm and a first microswitch; wherein the first swing arm is rotatably arranged on the stand, a rotation point where the first swing arm is connected to the stand is situated between two ends of the first swing arm, one end of the first swing arm extends out of the bottom face of the stand and one end of the first swing arm exceeds a rotation plane of the trimmer line when the trimmer head is rotated, the first microswitch is arranged on the stand, and the first microswitch is connected to the control assembly; and when the trimmer line hits one end of the first swing arm, another end of the first swing arm is rotated and abutted against the first microswitch, and the first microswitch outputs a first signal to the control assembly, wherein the first signal indicates that the unreeling length of the trimmer line reaches the predetermined length; or when the trimmer line does not hit one end of the first swing arm, another end of the first swing arm is not abutted against the first microswitch, and the first microswitch outputs a second signal, wherein the second signal indicates that the unreeling length of the trimmer line does not reach the predetermined length.

Optionally, the detection assembly further includes a push member, wherein the push member is arranged on the stand, the push member is connected to the first microswitch, and the push member is capable of pushing the first microswitch to switch between a first predetermined position and a second predetermined position; and when the first microswitch is at the first predetermined position, the trimmer line hits one end of the first swing arm, and another end of the first swing arm is rotated and abutted against the first microswitch; or when the first microswitch is at the second predetermined position, the trimmer line hits one end of the first swing arm, and another end of the first swing arm is rotated and not abutted against the first microswitch.

Optionally, the trimmer mechanism further includes a depth adjustment assembly, wherein the depth adjustment assembly is arranged on the stand, and the drive motor is arranged in the depth adjustment assembly.

Optionally, an extension space, a first opening, and a second opening are arranged in the stand; and the depth adjustment assembly includes a mount column, a knob, and a screw, wherein one end of the mount column is inserted into the extension space from the first opening, another end of the mount column is secured to the drive motor, a threaded hole is arranged in one end of the mount column, the extension space allows the mount column to move along the extension space, the extension space does not allow the mount column to rotate with respect to the extension space, the knob is rotatably mounted at the second opening, one end of the screw extends out from the second opening and is secured to the knob, and another end of the screw runs through the threaded hole and threaded to the threaded hole.

Optionally, a graduated scale is arranged on an outer surface of the mount column.

Optionally, the trimmer mechanism further includes an edge contact assembly connected to the control assembly, wherein the edge contact assembly is arranged on the stand, and along a side face perpendicular to the robotic body, the edge contact assembly is protruded from the trimmer head.

Optionally, the edge contact assembly further includes an edge contact strip, a second swing arm, and a second microswitch; wherein the edge contact strip is rotatably arranged on the stand, along a side face perpendicular to the robotic body, the edge contact strip extends out of the stand and is protruded from the trimmer head, the second swing arm is rotatably arranged on the stand, a rotation point where the second swing arm is connected to the stand is situated between two ends of the second swing arm, one end of the second swing arm extends out of a side face of the stand and one end of the second swing arm is situated on a movement trajectory when the edge contact strip is rotated, the second microswitch is arranged on the stand, the second microswitch is abutted against one end of the second swing arm, and the second microswitch is connected to the control assembly; and when the edge contact strip is in contact with an obstacle, the edge contact strip is rotated along a direction close to one end of the second swing arm and compresses the one end of the second swing arm, another end of the second swing arm is rotated and not abutted against the second microswitch, and the second microswitch outputs a third signal to the control assembly, wherein the third signal indicates that the edge contact strip is in contact with a boundary obstacle; or when the edge contact strip is not in contact with an obstacle, the edge contact strip is away from one end of the second swing arm and not abutted against the one end of the second swing arm, the one end of the second swing arm is abutted against the second microswitch, and the second microswitch outputs a fourth signal, wherein the fourth signal indicates that the edge contact strip is not in contact with a boundary obstacle.

The embodiments of the present disclosure achieve the following beneficial effects: Different from the related art, the robotic lawnmower with the trimmer mechanism is capable of covering and trimming the areas within a specific width distant from the edges of the lawns, which effectively solves the problem that the conventional robotic lawnmowers are incapable of covering and trimming such areas of the lawns, reduces manual workload, and lowers cost of manpower.

BRIEF DESCRIPTION OF THE DRAWINGS

For clearer descriptions of the technical solutions according to the specific embodiments of the present application or the technical solutions in the related art, the accompanying drawings incorporated for illustrating the specific embodiments or the related art are briefly described hereinafter. In all the accompanying drawings, like elements or parts are generally denoted by like reference numerals. In the accompanying drawings, various elements or parts are not necessarily drawn according to the actual scale.

Figure 1:
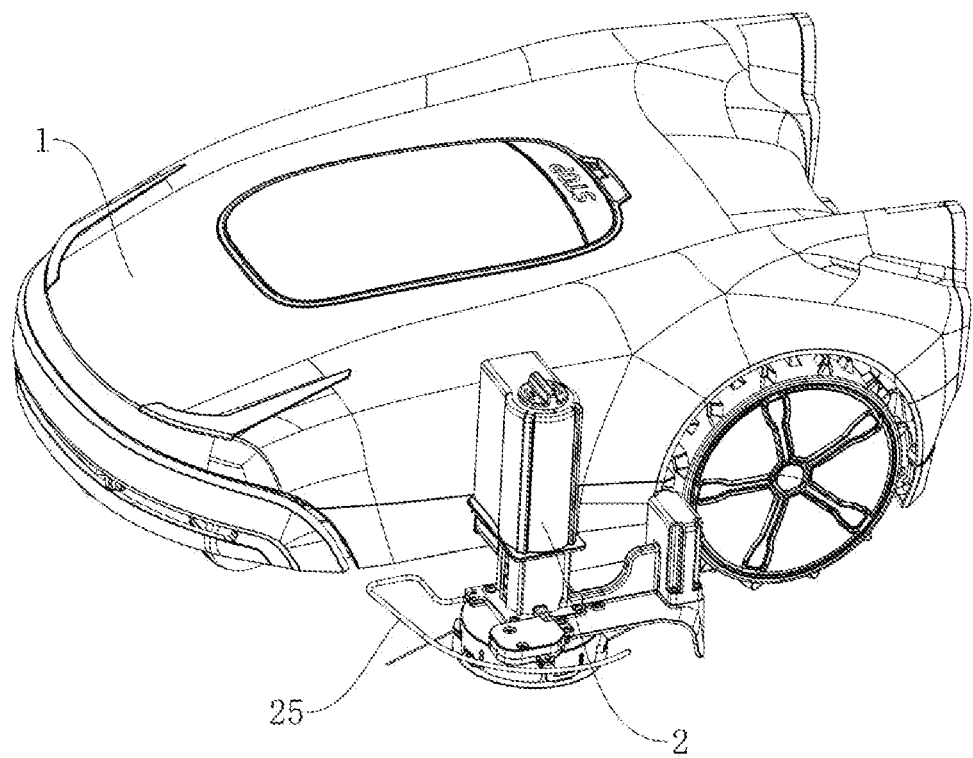
FIG. 1 is a schematic overall structural diagram of a robotic lawnmower according to an embodiment of the present disclosure.

Reference numerals and denotations thereof: 1—robotic body; 10—mount hole; 2—trimmer mechanism; 20—mount; 200—stand; 200a—extension space; 201a—first opening; 202a—second opening; 201—connection portion; 21—trimmer head; 210—housing; 211—spool; 2111—ratchet groove; 212—elastic member; 213—trimmer line; 214—accommodation chamber; 215—through hole; 216—ratchet bump; 22—drive motor; 23—detection assembly; 230—first swing arm; 231—first microswitch; 232—push member; 24—depth adjustment assembly; 240—mount column, 240a—graduated scale; 241—knob; 242—screw; 25—edge contact assembly; 250—edge contact strip; 251—second swing arm; 252—second microswitch; 3—plug mechanism; 26—control assembly.

DETAILED DESCRIPTION

For better understanding of the present disclosure, the present disclosure is described in detail with reference to attached drawings and specific embodiments. It should be noted that, when an element is defined as "being secured or fixed to" another element, the element may be directly positioned on the element or one or more centered elements may be present therebetween. When an element is defined as "being connected or coupled to" another element, the element may be directly connected or coupled to the element or one or more centered elements may be present therebetween. In the description of the present disclosure, it should be understood that the terms "upper," "lower," "inner," "outer," "vertical," "horizontal," and the like indicate orientations and position relationships which are based on the illustrations in the accompanying drawings, and these terms are merely for ease and brevity of the description, instead of indicating or implying that the devices or elements shall have a particular orientation and shall be structured and operated based on the particular orientation. Accordingly, these terms shall not be construed as limiting the present disclosure. In addition, the terms "first," "second," and the like are merely for the illustration purpose, and shall not be construed as indicating or implying a relative importance.

Unless the context clearly requires otherwise, throughout the specification and the claims, technical and scientific terms used herein denote the meaning as commonly understood by a person skilled in the art. Additionally, the terms used in the specification of the present disclosure are merely for description the embodiments of the present disclosure, but are not intended to limit the present disclosure. As used herein, the term "and/or" in reference to a list of one or more items covers all of the following interpretations of the term: any of the items in the list, all of the items in the list and any combination of the items in the list.

In addition, technical features involved in various embodiments of the present disclosure described hereinafter may be combined as long as these technical features are not in conflict.

Referring to FIG. 1 to FIG. 5, a robotic lawnmower includes a robotic body 1 and a trimmer mechanism 2. A mount hole 10 is arranged in a side face of the robotic body 1. The trimmer mechanism 2 includes a mount 20, a trimmer head 21, a drive motor 22, and a control assembly 26. The mount 20 includes a stand 200 and a connection portion 201. The connection portion 201 is fixedly connected to the stand 200 and configured to be inserted into the mount hole 10. The trimmer head 21 is rotatably arranged on a bottom face of the stand 200. The drive motor 22 is arranged on the stand 200. The drive motor 22 is connected to the trimmer head 21 and configured to drive the trimmer head 21 to rotate. The control assembly 26 is communicably connected to the drive motor 22.

In the embodiments of the present disclosure, the operating principles of the trimmer mechanism 2 of the robotic lawnmower are as follows: First, the connection portion 201 is inserted into the mount hole 10 such that the trimmer mechanism 2 establishes a communication connection to the robotic body 1 and thus the trimmer mechanism 2 acquires power from the robotic body 1; then, the robotic body 1 sends an instruction to the control assembly 26 according to automatic path planning and a defined operation mode; and finally, the control assembly 26 receives the instruction from the robotic body 1 and starts the drive motor 22, such that the trimmer head 21 starts operating and cuts the grass in the lawn. It should be noted that with an independent trimmer mechanism 2, the robotic lawnmower is capable of both simultaneously and separately trimming and cutting grass. In addition, the independent trimmer mechanism 2 and the robotic body 1 operate in a plug-and-play mode, and may be combined freely, such that flexibility and commercial value of function combinations of the robotic lawnmower. It should be further noted that in the embodiments of the present disclosure, the robotic lawnmower further includes a plug mechanism 3. When the trimmer mechanism 2 is no longer used and removed from the robotic lawnmower, the plug mechanism 3 may be inserted into the mount hole 10 to prevent dust or water from entering the mount hole 10 and hence causing poor contact or damages.

In the embodiments of the present disclosure, with the trimmer mechanism 2, the robotic lawnmower is capable of covering and trimming the areas within a specific width distant from the edges of the lawns, which effectively solves the problem that the conventional robotic lawnmowers are incapable of covering and trimming such areas of the lawns, reduces manual workload, and lowers cost of manpower.

Figure 6:
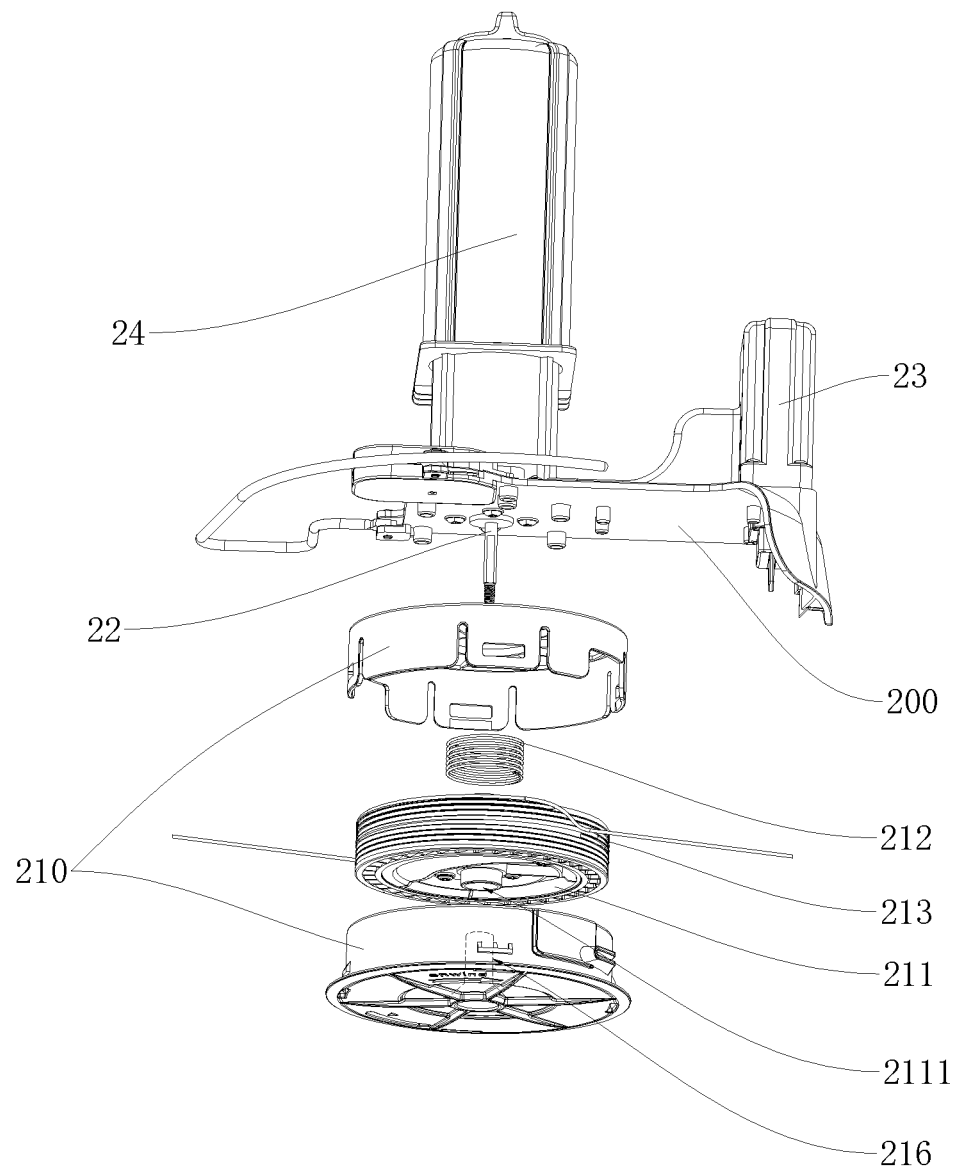
FIG. 6 is a first schematic structural diagram of a trimmer head of the trimmer mechanism of the robotic lawnmower according to an embodiment of the present disclosure.
Figure 7:
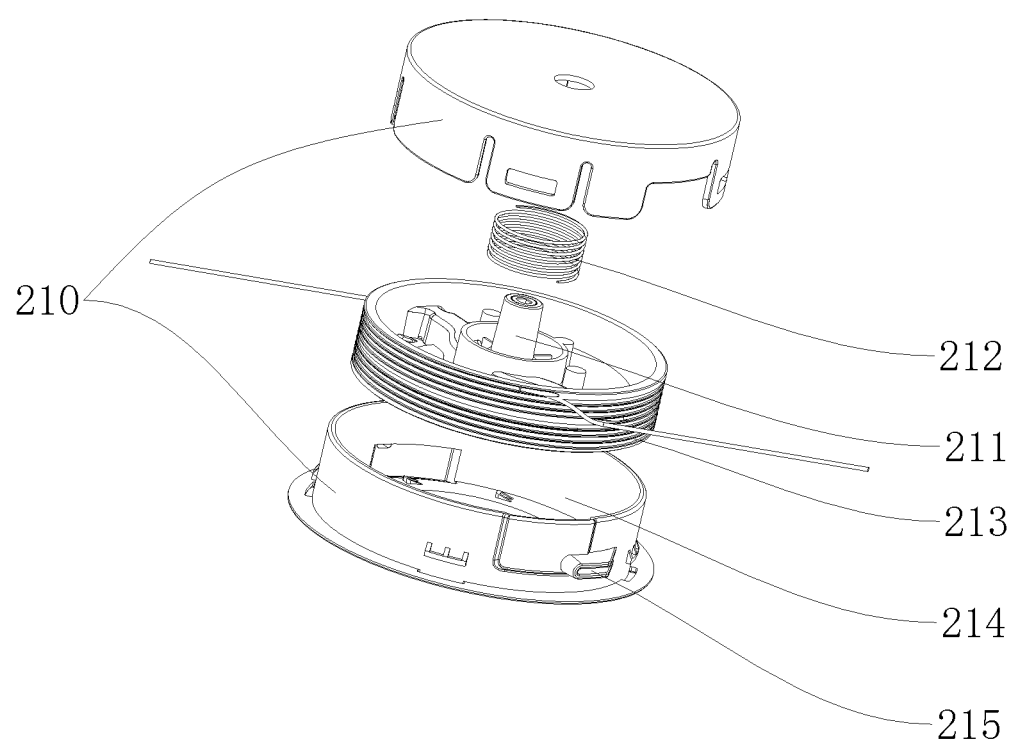
FIG. 7 is a second schematic structural diagram of the trimmer head of the trimmer mechanism of the robotic lawnmower according to an embodiment of the present disclosure.

Referring to FIG. 6 and FIG. 7, the trimmer head 21 includes a housing 210, a spool 211, an elastic member 212, and a trimmer line 213. The housing 210 is arranged at a bottom portion of the stand 200. An accommodation chamber 214 and a through hole 215 are arranged in the housing 21. A ratchet bump 216 is arranged at a bottom portion of the housing 210. The through hole 215 is in communication with the accommodation chamber 214. A ratchet groove 2111 is arranged in the spool 211. The spool 211 is arranged in the accommodation chamber 214. The elastic member 212 is situated between the spool 211 and a top portion of the housing 210, and the elastic member 212 is configured to drive the spool 211 to be abutted against the bottom portion of the housing 210 such that the ratchet bump 216 is inserted into the ratchet groove 2111 and is meshed with the ratchet groove 2111 in a rotation direction of the drive motor 22 for synchronous rotation of the spool 211 and the housing 210. One end of the trimmer line 213 extends out from the through hole 215. The drive motor 22 is arranged on the stand 200. An output shaft of the drive motor 22 extends into the housing 210 and is connected to the spool 211. The drive motor 22 is configured to drive the spool 211 to rotate and drive the housing 210 to synchronously rotate to drive the trimmer line 213 to rotate and unreel the trimmer line 213. The drive motor 22 is communicably connected to the control assembly 26.

The trimmer head 21 drives the trimmer line 213 by the following operation principles: First, the control assembly 26 receives the instruction from the robotic body 1 and starts the drive motor 22 for rotation, such that the spool 211 is synchronously rotated; the ratchet bump 216 is inserted into the ratchet groove 2111 and is meshed with the ratchet groove 2111 in the rotation direction of the drive motor 22, and the elastic member 212 drives the spool 211 to be abutted against the bottom portion of the housing 210, such that the housing 210 is synchronously rotated, whereby another end of the trimmer line 213 extending out from the through hole 215 is rotated at a high speed and thus flexible high-speed cutting is carried out for the lawn in contact with the trimmer line 213. The ratchet bump 216 is inserted into the ratchet groove 2111, and the ratchet bump 216 and the ratchet groove 2111 are meshed with each other in the rotation direction of the drive motor 22, such that the spool 211 is automatically inserted and limited, and thus is incapable of reversely rotated. This prevents the trimmer line 213 from being unreeled, and thus the trimmer line 213 is prevented from being shortened.

The trimmer line 21 may accelerate or decelerate to control unreeling of the trimmer line 213. When the trimmer line 213 is subjected to wear and tear and has an insufficient length, and the trimmer line 213 needs to be unreeled, the unreeling principles are as follows: First, rotation of the drive motor 22 is controlled to be decelerated or stopped, such that rotation of the spool 211 is decelerated or stopped and hence an inertial force generated by the housing 210 and a centrifugal force of the trimmer line 213 drive the ratchet bump 216 compresses the elastic member 212 by a bevel face thereof to cause deformation and is thereby detached from the ratchet groove 2111; in this way, the spool 211 generates a displacement in a direction reverse to the rotation direction of the drive motor 22, such that the trimmer line 213 is thrown out by a specific length via the through hole 215; then, when rotation of the drive motor 22 is accelerated again or the inertial force generated by the housing 210 and the centrifugal force of the trimmer line 213 disappears, under an resilience effect of the elastic member 212, the ratchet bump 216 is inserted into the ratchet groove 2111 again and is meshed with the ratchet groove 2111 in the rotation direction of the drive motor 22; and finally, rotation of the drive motor 22 is repeatedly controlled to be accelerated and decelerated, such that the trimmer line 213 is repeatedly thrown out by a specific length, until the unreeling length of the trimmer line 213 satisfies the actual needs.

It should be noted that the housing 210 may be divided into an upper cover and a lower cover, and the two covers are detachably connected by snap-fitting. In this way, the trimmer line 213 may be quickly replaced by a new one when the trimmer line 213 wound on the spool 211 is used up.

Figure 4:
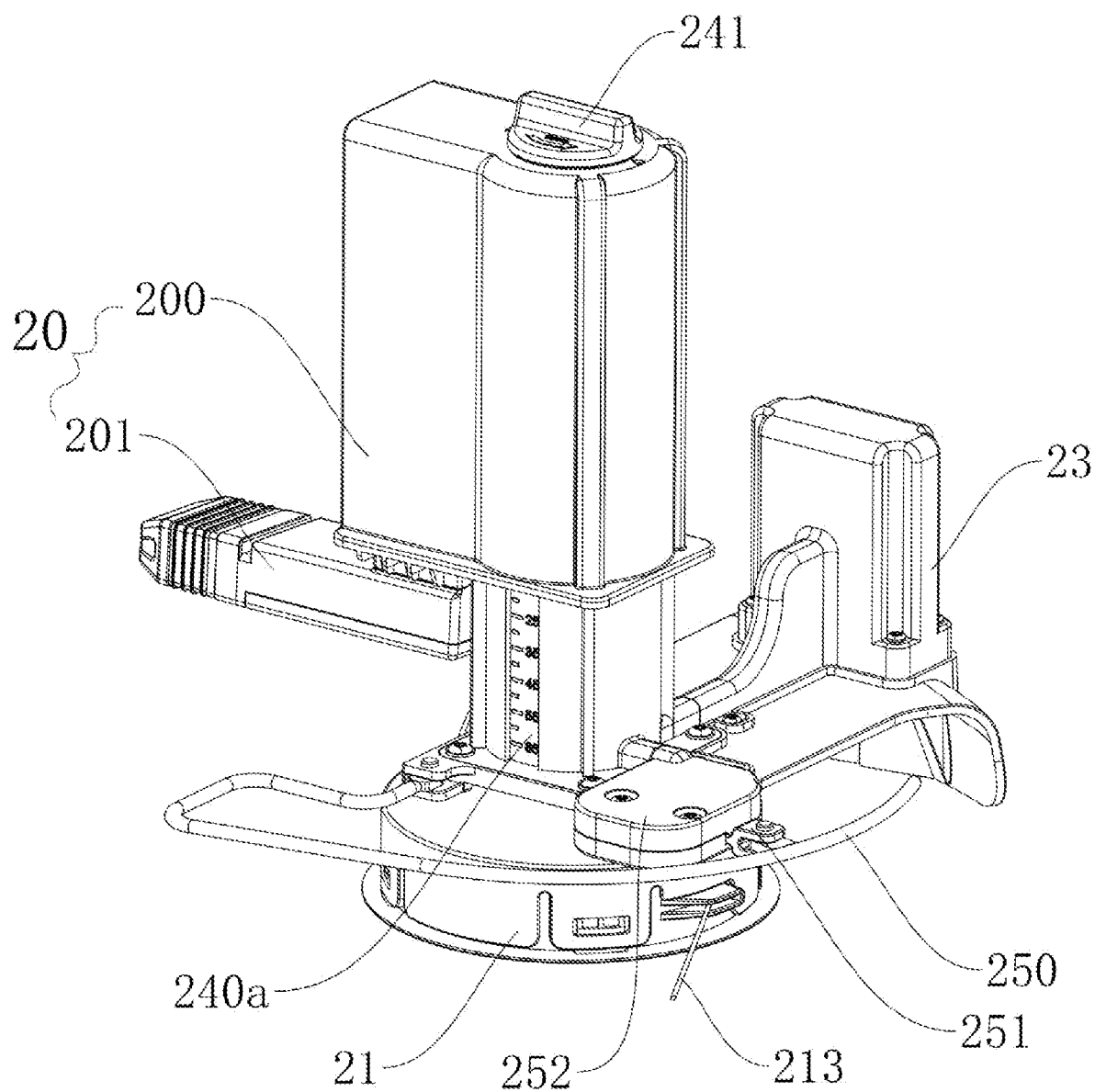
FIG. 4 is a first schematic structural diagram of the trimmer mechanism of the robotic lawnmower according to an embodiment of the present disclosure.
Figure 5:
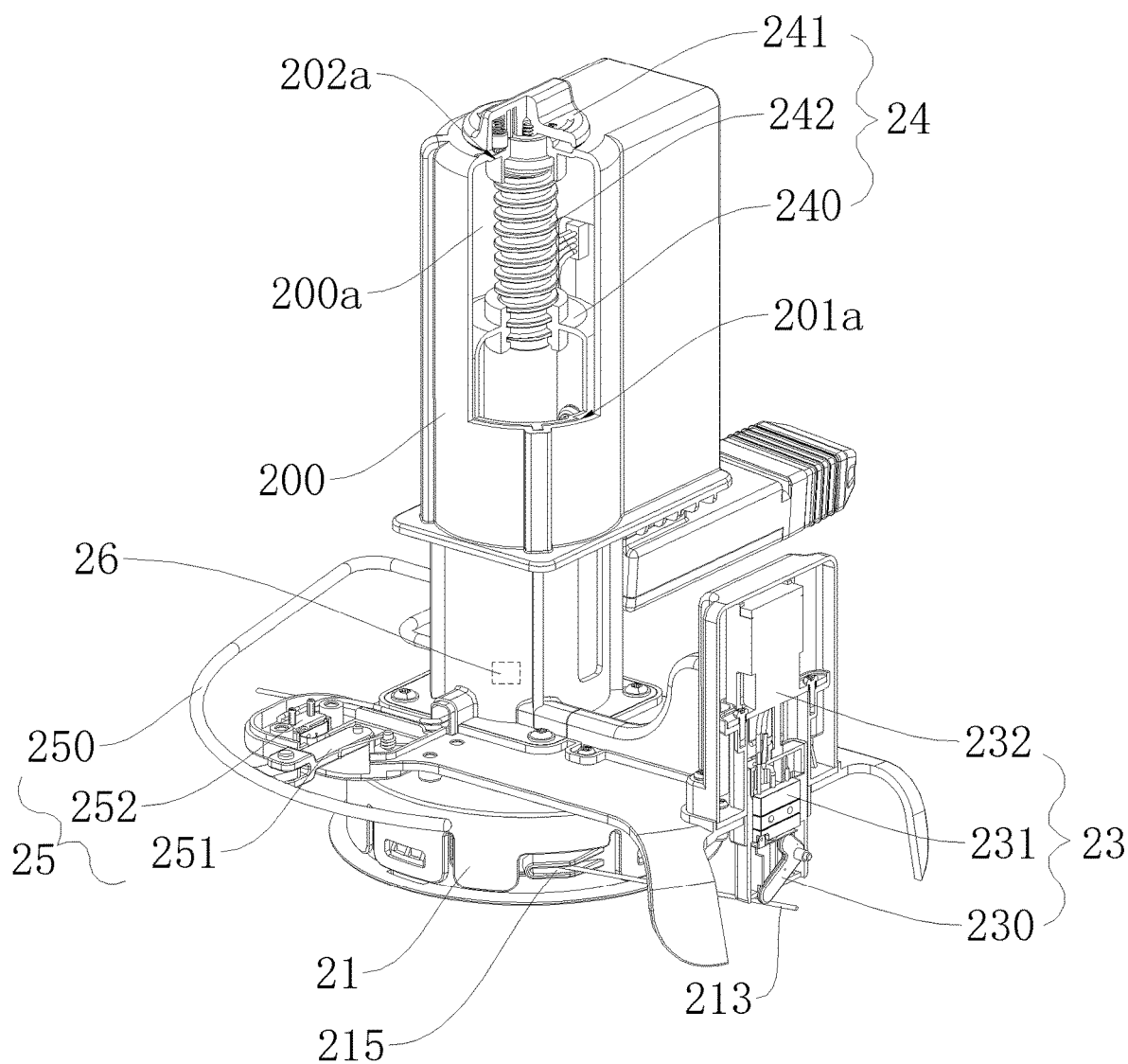
FIG. 5 is a second schematic structural diagram of the trimmer mechanism of the robotic lawnmower according to an embodiment of the present disclosure.

Referring to FIG. 4 and FIG. 5, the trimmer mechanism 2 further includes a detection assembly 23. The detection assembly 23 is arranged on the stand 200. The detection assembly 23 is communicably connected to the control assembly 26. The detection assembly 23 is configured to detect whether an unreeling length of the trimmer line 213 reaches a predetermined length. The control assembly 26 is configured to, in response to detecting that the unreeling length of the trimmer line 213 does not reach the predetermined length, control the drive motor 22 to rotate such that the spool 211 unreels the trimmer line 213 until the unreeling length of the trimmer line 213 reaches the predetermined length.

With the detection assembly 23, the robotic lawnmower has a function of detecting whether the unreeling length of the trimmer line 213 reaches a predetermined length, such that the trimmer line 213 is prevented from exceeding the predetermined length and thus excessive wear and tear of the trimmer line 213 is avoided. This also avoids the case where a trimming effect at the edge of the lawn is affected because the unreeling length of the trimmer line 213 does not reach the predetermined length.

Referring to FIG. 4 and FIG. 5, the detection assembly 23 includes a first swing arm 230 and a first microswitch 231. The first swing arm 230 is rotatably arranged on the stand 200. A rotation point where the first swing arm 230 is connected to the stand 200 is situated between two ends of the first swing arm 230. One end of the first swing arm 230 extends out of the bottom face of the stand 200 and one end of the first swing arm 230 exceeds a rotation plane of the trimmer line 213 when the trimmer head 21 is rotated. The first microswitch 231 is arranged on the stand 200, and the first microswitch 231 is connected to the control assembly 26. When the trimmer line 213 hits one end of the first swing arm 230, another end of the first swing arm 230 is rotated and abutted against the first microswitch 231, and the first microswitch 231 outputs a first signal to the control assembly 26, wherein the first signal indicates that the unreeling length of the trimmer line 213 reaches the predetermined length. When the trimmer line 213 does not hit one end of the first swing arm 230, another end of the first swing arm 230 is not abutted against the first microswitch 231, and the first microswitch 231 outputs a second signal, wherein the second signal indicates that the unreeling length of the trimmer line 213 does not reach the predetermined length.

The process that the detection assembly 23 detects whether the unreeling length of the trimmer line 213 reaches the predetermined length is as follows: First, when the trimmer line 213 starts operating, the detection assembly 23 is started; in this case, the detection assembly 23 is in an initial state, and in this state, one end of the first swing arm 230 exceeds the rotation plane of the trimmer line 213 when the trimmer head 21 is rotated; then, where the trimmer line 213 does not hit one end of the first swing arm 230, the first microswitch 231 outputs the second signal and feed the second signal to the control assembly 26, and upon receiving the second signal, the control assembly 26 sends an instruction to the drive motor and drives the trimmer head 21 to unreel the trimmer line 212 until the unreeling length of the trimmer line 213 is sufficient to collide with the first swing arm 230; where the trimmer line 213 hits one end of the first swing arm 230, the first microswitch 231 outputs the first signal and feed the first signal to the control assembly 26, and upon receiving the first signal, the control assembly 26 sends an instruction to the drive motor 22 and drives the trimmer head 21 to continue the operation of the trimmer line 213. It should be noted that by the control assembly 26, the detection assembly 23 may be set and caused to detect the length of the trimmer line 213 according to a fixed frequency.

Further, referring to FIG. 5, the detection assembly 23 further includes a push member 232. The push member 232 is arranged on the stand 200. The push member 232 is connected to the first microswitch 231. The push member 232 is capable of pushing the first microswitch 231 to switch between a first predetermined position and a second predetermined position. When the first microswitch 231 is at the first predetermined position, the trimmer line 213 hits one end of the first swing arm 230, and another end of the first swing arm 230 is rotated and abutted against the first microswitch 231. When the first microswitch 231 is at the second predetermined position, the trimmer line 213 hits one end of the first swing arm 230, and another end of the first swing arm 230 is rotated and not abutted against the first microswitch 231.

With the push member 232, the detection assembly 23 has a function of resetting the first microswitch 231. In the initial state, the first microswitch 231 is in the first predetermined position. When the first microswitch 231 is rotated by and abutted against the first swing arm 230, the first microswitch 231 is in the second predetermined position. Under a pushing effect of the push member 232, the first microswitch 231 switch to the first predetermined position, such that the first microswitch 231 is reset.

It should be noted that each time upon completion of detection of the length of the trimmer line 213 by the detection assembly 23, where the first microswitch 231 is in the second predetermined position, the control assembly 26 will send an instruction to the push assembly 232, and drive the first microswitch 231 to reset such that first microswitch 231 is in the first predetermined position.

It should be further noted that compared with other typical detection assemblies structurally designed with a photo, electro or ultrasonic sensor, the detection assembly 23 in the embodiments of the present disclosure, based on mechanical structural design including the first swing arm 230, the first microswitch 231, and the push member 232, and communicative cooperation of the control assembly 26, effectively lower the probability of mis-touch of the detection assembly 23, such that the trimmer mechanism 2 is capable of stably automatically monitoring and reporting feedback on wear and tear of the trimmer line 213 when no one is around.

In some embodiments, the push member 232 may be an electromagnetic actuator structure.

Referring to FIG. 4 and FIG. 5, the trimmer mechanism 2 further includes a depth adjustment assembly 24. The depth adjustment assembly 24 is arranged on the stand 200. The drive motor 22 is arranged in the depth adjustment assembly 24.

With the depth adjustment assembly 24, the trimmer mechanism 2 has a depth adjustment function. When the user needs to adjust a trimming height, the height of the drive motor 22 may be adjusted by the depth adjustment assembly 24, such that the trimmer head 21 is lowered and raised. In this way, the height of the trimmer line 213 is adjusted, such that the trimming height is adjusted.

Referring to FIG. 5, an extension space 200a, a first opening 201a, and a second opening 202a are arranged in the stand 200, and the depth adjustment assembly 24 includes a mount column 240, a knob 241, and a screw 242. One end of the mount column 240 is inserted into the extension space 200a from the first opening 201a, and another end of the mount column 240 is secured to the drive motor 22. A threaded hole is arranged in one end of the mount column 240. The extension space 200a allows the mount column 240 to move along the extension space 200a. The extension space 200a does not allow the mount column 240 to rotate with respect to the extension space 200a. The knob 241 is rotatably mounted at the second opening 202a. One end of the screw 242 extends out from the second opening 202a and is secured to the knob 241, and another end of the screw 242 runs through the threaded hole and threaded to the threaded hole.

When a user needs to adjust the trimming height, the depth adjustment assembly 24 adjust the trimming height as follows: First, the knob 241 is manually turned to drive the screw 242 to rotate, and hence drive the mount column 240 to move along the extension space 200a, such that the drive motor 22 is driven to be lowered and raised. In this way, the trimmer head 21 is lowered and raised, and the trimming height is finally adjusted.

Further, referring to FIG. 4, a graduated scale 240a is arranged on an outer surface of the mount column 240. With the graduated scale 240a, when a user adjusts the trimming height, height adjustment reference markings may be provided for the user, such that the user quickly adjust the trimming height to a predetermined value.

Referring to FIG. 4 and FIG. 5, the trimmer mechanism 2 further includes an edge contact assembly 25 connected to the control assembly 26. The edge contact assembly 25 is arranged on the stand 200, and along a side face perpendicular to the robotic body 1, the edge contact assembly 25 is protruded from the trimmer head 21.

Figure 2:
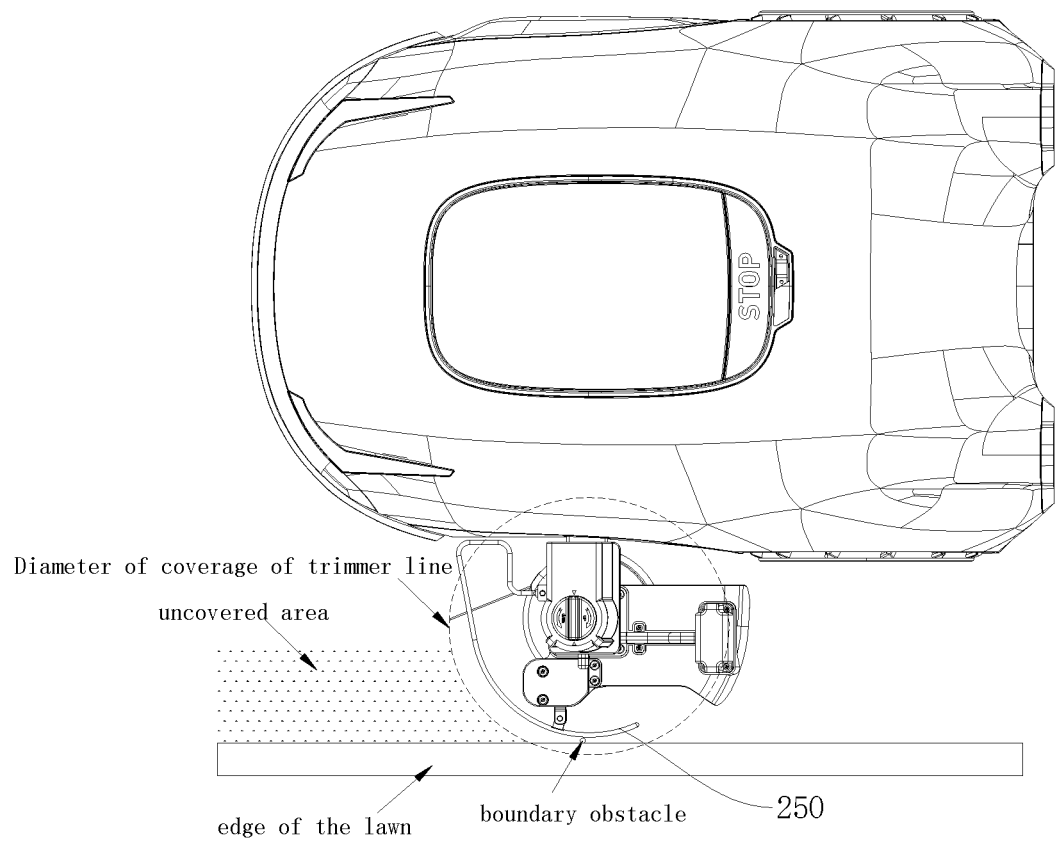
FIG. 2 is a schematic diagram of an operating state of a trimmer mechanism of the robotic lawnmower according to an embodiment of the present disclosure.
Figure 3:
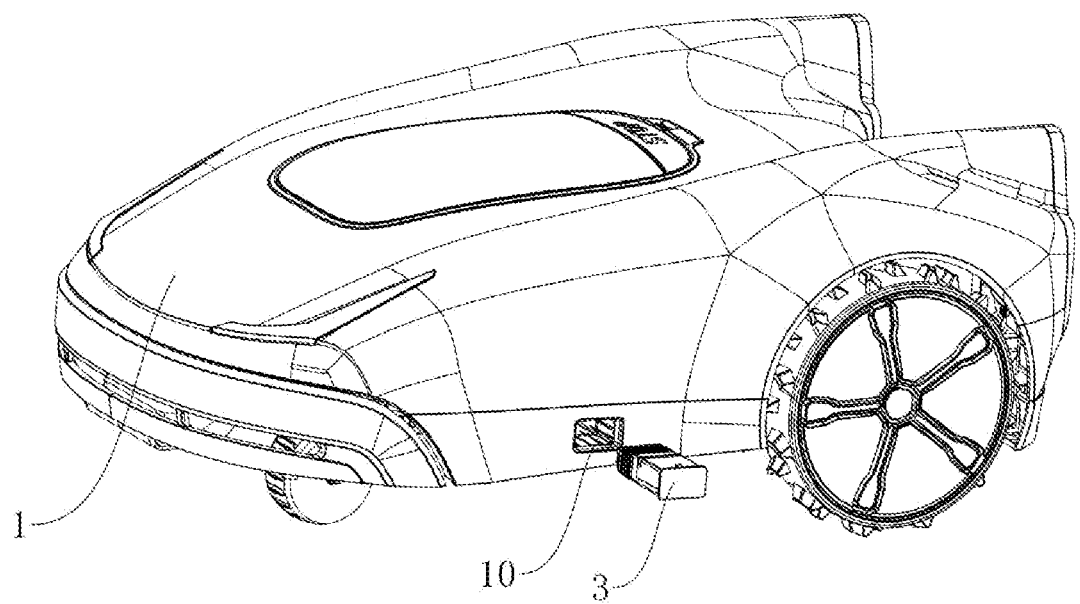
FIG. 3 is a schematic diagram of a mounting state of a plug mechanism of the robotic lawnmower according to an embodiment of the present disclosure.

Referring to FIG. 2, with the edge contact assembly 25, the robotic lawnmower has a function of automatically detection edges. When the robotic lawnmower with the trimming mechanism 2 travels around the edges of the lawn and edge navigation data is lost due to environmental factor or interference, the edge contact assembly 25 is capable of giving real-time feedback to the control assembly 26 and finally sending the feedback to the robotic body 1, such that the robotic lawnmower makes corresponding position adjustment. This addresses the problem that the travel path of the robotic lawnmower is out of control due to navigation errors and hence the edges of the lawn are not trimmed, and an uncovered area is created. The uncovered area refers to the area that cannot be reached by the diameter of coverage of the trimmer line 213.

Referring to FIG. 4 and FIG. 5, the edge contact assembly 25 further includes an edge contact strip 250, a second swing arm 251, and a second microswitch 252. The edge contact strip 250 is rotatably arranged on the stand 200. Along a side face perpendicular to the robotic body 1, the edge contact strip 250 is protruded from the trimmer head 21. The second swing arm 251 is rotatably arranged on the stand 200. A rotation point where the second swing arm 251 is connected to the stand 200 is situated between two ends of the second swing arm 251. One end of the second swing arm 251 extends out of a side face of the stand 200 and one end of the second swing arm 251 is situated on a movement trajectory when the edge contact strip 250 is rotated. The second microswitch 252 is arranged on the stand 200. The second microswitch 252 is abutted against one end of the second swing arm 251, and the second microswitch 252 is connected to the control assembly 26. When the edge contact strip 250 is in contact with an obstacle, the edge contact strip 250 is rotated along a direction close to one end of the second swing arm 251 and compresses the one end of the second swing arm 251, another end of the second swing arm 251 is rotated and not abutted against the second microswitch 252, and the second microswitch 252 outputs a third signal to the control assembly 26, wherein the third signal indicates that the edge contact strip 250 is in contact with a boundary obstacle. When the edge contact strip 250 is not in contact with an obstacle, the edge contact strip 250 is away from one end of the second swing arm 251 and not abutted against the one end of the second swing arm 251, the one end of the second swing arm 251 is abutted against the second microswitch 252, and the second microswitch 252 outputs a fourth signal, wherein the fourth signal indicates that the edge contact strip 250 is not in contact with a boundary obstacle.

When the robotic lawnmower travels towards the edges of the lawn or is in contact with a boundary obstacle due to loss of navigation signals, the edge contact assembly 25 operates as follows: The boundary obstacle presses the edge contact strip 250 and drives the edge contact strip 250 to rotate along a direction approaching one end of the second swing arm 251, such that the edge contact strip 250 presses one end of the second swing arm 251 and drives another end of the second swing arm 251 to rotate, and hence the second microswitch 252 is detached and abutted against one end of the second swing arm 251 and the second microswitch 252 is triggered to output a third signal. In this way, the robotic lawnmower makes a timely avoidance action. When the robotic lawnmower makes an anti-avoidance action, the edge contact strip 250 is detached from the boundary obstacle, such that the edge touch strip 250 is rotated along a direction away from one end of the second swing arm 251 and detached from one end of the second swing arm 251, and hence another end of the second swing arm 251 is rotated and one end of the second swing arm 251 is driven to be abutted against the second microswitch 252 again such that the second microswitch 252 is triggered to output a fourth signal.

It should be noted that in the embodiments of the present disclosure, the edge contact strip 250 is a strip-shaped edge contact structure configured to transmit a pressure upon being pressed. In some embodiments, the edge contact strip 250 may also be a wheel-type contact structure configured to transmit a pressure upon being pressed.

Described above are exemplary embodiments of the present disclosure, but are not intended to limit the scope of the present disclosure. Any equivalent structure or equivalent process variation made based on the specification and drawings of the present disclosure, which is directly or indirectly applied in other related technical fields, fall within the scope of the present disclosure.

What is claimed is:
1. A robotic lawnmower, comprising:
   a robotic body, wherein a mount hole is defined in a side face of the robotic body; and
   a trimmer mechanism, comprising a mount, a trimmer head, a drive motor, a control assembly, a detection assembly, and an edge contact assembly, the mount comprising a stand and a connection portion, wherein the connection portion is fixedly connected to the stand and configured to be inserted into the mount hole, the trimmer head is rotatably arranged on a bottom face of the stand, the drive motor is arranged on the stand, the drive motor is connected to the trimmer head and configured to drive the trimmer head to rotate, and the control assembly is communicably connected to the drive motor;
   wherein the trimmer head comprises a housing, a spool, an elastic member, and a trimmer line;
   wherein the housing is arranged at a bottom portion of the stand, an accommodation chamber and a through hole are arranged in the housing, and a ratchet bump is arranged at a bottom portion of the housing, wherein the through hole is in communication with the accommodation chamber, a ratchet groove is arranged in the spool, the spool is arranged in the accommodation chamber, the elastic member is situated between the spool and a top portion of the housing, the elastic member is configured to drive the spool to be abutted against the bottom portion of the housing such that the ratchet bump is inserted into the ratchet groove and is meshed with the ratchet groove in a rotation direction of the drive motor for synchronous rotation of the spool and the housing, one end of the trimmer line extends out from the through hole, the drive motor is arranged on the stand, an output shaft of the drive motor extends into the housing and is connected to the spool, the drive motor is configured to drive the spool to rotate and drive the housing to synchronously rotate to drive the trimmer line to rotate and unreel the trimmer line, and the drive motor is communicably connected to the control assembly;

wherein the detection assembly is arranged on the stand, the detection assembly is communicably connected to the control assembly, the detection assembly is configured to detect whether an unreeling length of the trimmer line reaches a predetermined length, and the control assembly is configured to, in response to detecting that the unreeling length of the trimmer line does not reach the predetermined length, control the drive motor to rotate such that the spool unreels the trimmer line until the unreeling length of the trimmer line reaches the predetermined length;

wherein the edge contact assembly connected to the control assembly, wherein the edge contact assembly is arranged on the stand, and along a side face perpendicular to the robotic body, the edge contact assembly is protruded from the trimmer head.

2. The robotic lawnmower according to claim 1, wherein the detection assembly comprises a first swing arm and a first microswitch; wherein the first swing arm is rotatably arranged on the stand, a rotation point where the first swing arm is connected to the stand is situated between two ends of the first swing arm, one end of the first swing arm extends out of the bottom face of the stand and one end of the first swing arm exceeds a rotation plane of the trimmer line when the trimmer head is rotated, the first microswitch is arranged on the stand, and the first microswitch is connected to the control assembly; and when the trimmer line hits one end of the first swing arm, another end of the first swing arm is rotated and abutted against the first microswitch, and the first microswitch outputs a first signal to the control assembly, wherein the first signal indicates that the unreeling length of the trimmer line reaches the predetermined length; or when the trimmer line does not hit one end of the first swing arm, another end of the first swing arm is not abutted against the first microswitch, and the first microswitch outputs a second signal, wherein the second signal indicates that the unreeling length of the trimmer line does not reach the predetermined length.

3. The robotic lawnmower according to claim 2, wherein the detection assembly further includes a push member, wherein the push member is arranged on the stand, the push member is connected to the first microswitch, and the push member is capable of pushing the first microswitch to switch between a first predetermined position and a second predetermined position; and when the first microswitch is at the first predetermined position, the trimmer line hits one end of the first swing arm, and another end of the first swing arm is rotated and abutted against the first microswitch; or when the first microswitch is at the second predetermined position, the trimmer line hits one end of the first swing arm, and another end of the first swing arm is rotated and not abutted against the first microswitch.

4. The robotic lawnmower according to claim 1, wherein the trimmer mechanism further comprises a depth adjustment assembly, wherein the depth adjustment assembly is arranged on the stand, and the drive motor is arranged in the depth adjustment assembly.

5. The robotic lawnmower according to claim 4, wherein an extension space, a first opening, and a second opening are arranged in the stand; and the depth adjustment assembly comprises a mount column, a knob, and a screw, wherein one end of the mount column is inserted into the extension space from the first opening, another end of the mount column is secured to the drive motor, a threaded hole is arranged in one end of the mount column, the extension space allows the mount column to move along the extension space, the extension space does not allow the mount column to rotate with respect to the extension space, the knob is rotatably mounted at the second opening, one end of the screw extends out from the second opening and is secured to the knob, and another end of the screw runs through the threaded hole and threaded to the threaded hole.

6. The robotic lawnmower according to claim 5, wherein a graduated scale is arranged on an outer surface of the mount column.

7. The robotic lawnmower according to claim 1, wherein the edge contact assembly further comprises an edge contact strip, a second swing arm, and a second microswitch; wherein the edge contact strip is rotatably arranged on the stand, along a side face perpendicular to the robotic body, the edge contact strip extends out of the stand and is protruded from the trimmer head, the second swing arm is rotatably arranged on the stand, a rotation point where the second swing arm is connected to the stand is situated between two ends of the second swing arm, one end of the second swing arm extends out of a side face of the stand and one end of the second swing arm is situated on a movement trajectory when the edge contact strip is rotated, the second microswitch is arranged on the stand, the second microswitch is abutted against one end of the second swing arm, and the second microswitch is connected to the control assembly; and when the edge contact strip is in contact with an obstacle, the edge contact strip is rotated along a direction close to one end of the second swing arm and compresses the one end of the second swing arm, another end of the second swing arm is rotated and not abutted against the second microswitch, and the second microswitch outputs a third signal to the control assembly, wherein the third signal indicates that the edge contact strip is in contact with a boundary obstacle; or when the edge contact strip is not in contact with an obstacle, the edge contact strip is away from one end of the second swing arm and not abutted against the one end of the second swing arm, the one end of the second swing arm is abutted against the second microswitch, and the second microswitch outputs a fourth signal, wherein the fourth signal indicates that the edge contact strip is not in contact with a boundary obstacle.

\* \* \* \* \*